Oct. 15, 1968     F. BECKER ET AL     3,405,667
REFUSE BURNING INSTALLATIONS
Filed Dec. 15, 1966     2 Sheets-Sheet 1
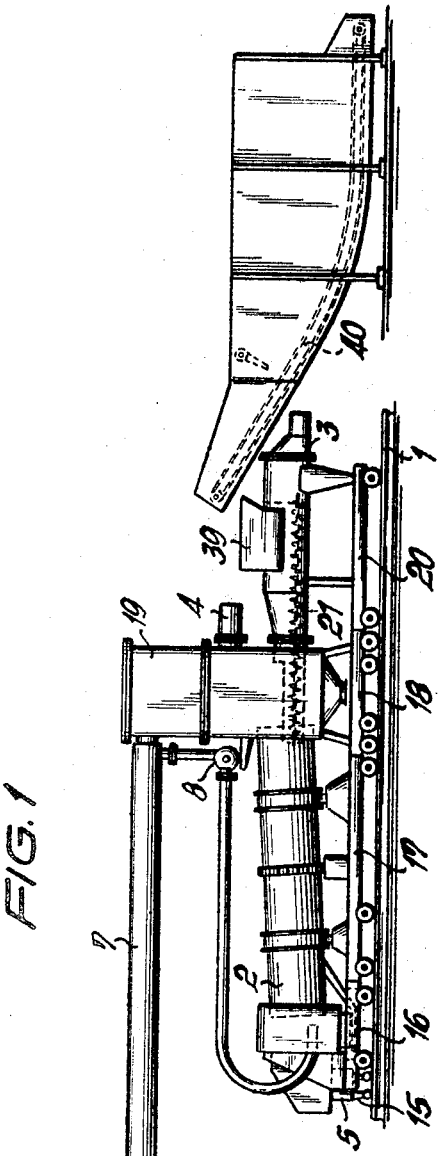
FIG.1
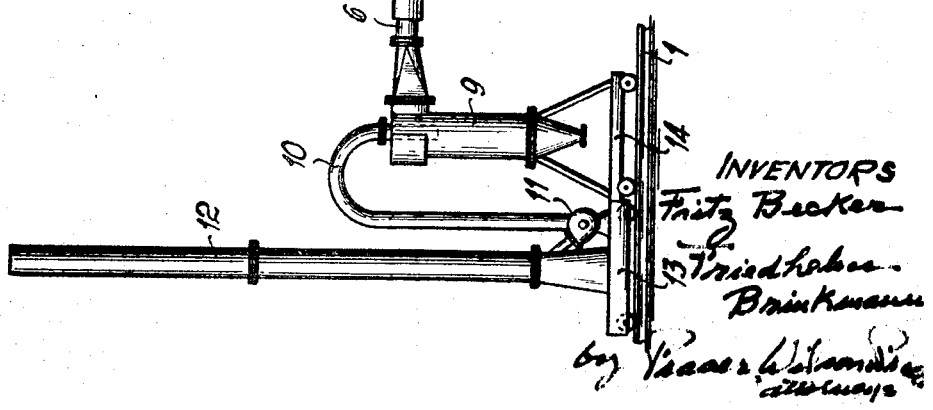
INVENTORS
Fritz Becker
Friedhelm Brinkmann

United States Patent Office 3,405,667
Patented Oct. 15, 1968

3,405,667
REFUSE BURNING INSTALLATIONS
Fritz Becker, Ewaldstrasse 6, and Friedhelm Brinkmann, Mont-Genis-Strasse 129, both of Herne, Germany
Filed Dec. 15, 1966, Ser. No. 602,066
Claims priority, application Germany, Dec. 29, 1965, B 64,630
7 Claims. (Cl. 110—14)

ABSTRACT OF THE DISCLOSURE

A refuse burning plant has a rotary kiln to one end of which refuse is charged, and, at the opposite end, ash is removed. A burner supplies heat to the kiln, and flue means connected to the kiln preheats air required for burning the refuse. Means are provided for removing dust from the kiln flue gas. Separate vehicles support various components and these are separably connected. The vehicles can thus be separated for inspection or repair and can be transported by means of low loaders.

The present invention relates to installations for burning refuse of the type comprising a rotary kiln, means for charging into the one end of the kiln, an ash removing means at the other end of the kiln, a burner for supplying heat to the kiln, flue means connected with the kiln, the flue means serving for preheating air needed for combustion of the refuse, and means for removing dust from flue gas from the furnace.

The primary purpose of destroying refuse by burning is that of converting the refuse into products which present no health hazard and take up little space in comparison with the bulk of the refuse before burning. In other words the requirements are intended to overcome the problems created by the alternative method of refuse disposal, that is to say the establishment of rubbish tips.

Although attempts have been made to make use of the heat generated when refuse is burnt, this has only been found to be practical in the case of stationary installations, usually connected with a power station. There are in fact a number of disadvantages in designing a refuse disposal installation so as to generate power.

Large stationary refuse disposal plants suffer from the obvious disadvantage that they cannot be moved once they have been constructed. A further disadvantage is that they are, for one reason or another, generally built to serve large areas so that long transport runs are needed, not only for the refuse, but also, in many cases for the ash waste. A further difficulty with large installations is that refuse has a small specific heat of combustion and it is difficult to maintain the same heat output over periods of time.

A further disadvantage is that boilers used in such installations are subject to comparatively rapid corrosion owing to the presence in the flue gases of the products of combustion of plastics which frequently occur in the refuse.

As a result, the ability to use the heat of combustion of refuse is by no means a decisive factor in the design of refuse burning or incinerating plants.

An object of the present invention is to provide a refuse burning installation which will meet the needs of medium-sized communities.

A further object of the invention is to reduce the amount of transport of refuse necessary for operation of a refuse burning installation.

Accordingly the present invention consists in a refuse burning plant comprising a rotary kiln, means for charging refuse into one end of the kiln, ash removing means at the other end of the kiln, a burner for supplying heat to the kiln, flue means connected with the kiln, the flue means serving for preheating air needed for combustion of the refuse, means for removing dust from flue gas from the kiln, separate vehicles on which parts of the installation are mounted, and disconnectable connections between adjacent parts of the installation mounted on separate vehicles.

The parts of the installation can be moved from one placement to another by means of low loaders so that the amount of refuse transport is reduced. The low loaders are preferably not the vehicles upon which the installation is mounted for operation.

In accordance with a preferred feature of the invention, the installation comprises a separate vehicle carrying the refuse charging means, a screw conveyor forming part of the charging means, a combustion chamber serving for ensuring that products of combustion leaving the kiln are fully burnt, the charging means being arranged to pass refuse through the combustion chamber into the kiln, and a burner in the combustion chamber for encouraging the products of combustion in a gaseous state in the kiln to flow in a direction of travel opposite to the direction of travel of the refuse in the kiln, the burner also serving for preheating air needed for combustion. The advantage of such an arrangement is that not only is the refuse loosened by the screw conveyor and dried to a greater or lesser extent before it enters the kiln, but also products of combustion emerging from the kiln are "post-burned," i.e., subjected to a combustion process in order to ensure that no unpleasant or unhealthy gaseous products leave the installation. It is also ensured that the refuse is thoroughly burned and that the ash is not objectionable from the health point of view.

In accordance with a further feature of the invention, an open chute is provided in the combustion chamber for supporting the refuse moved by the screw conveyor. The steam released from the refuse lying on the chute mixes with the gaseous products of combustion emerging from the kiln (which also have a drying action on the refuse) and the mixture is subjected to the burning action of the burner. After this the gaseous products leave through the exit of the combustion chamber as flue gases and heat the air needed for combustion.

Preferably the chute in the combustion chamber is open in an upward direction and co-operates with the end part of the screw conveyor.

The ash leaving the end of the kiln is at such a high temperature that it must be cooled before transport and therefore, in accordance with a further preferred feature of the present invention, the installation further comprises a separate vehicle carrying the ash removing means, shovel means arranged to rotate with the kiln, and a water pan into which the shovel means dip. This is a particularly convenient arrangement for ensuring that the rate of removal of ash corresponds with the throughput of the kiln; that is to say, the greater the rate of the throughput of the kiln, and therefore the greater its speed of rotation, the faster the rate at which ash is removed from the water pan by the shovel means. There is also the advantage that a separate drive means is not required for the ash removal means.

In order to prevent the shovel means jamming against the bottom of the pan or otherwise, the shovel means can be carried resiliently on arms rotating with the kiln.

In order to use more than one burner for incinerating the refuse, it has been found convenient to provide a chamber at the ash exit end of the kiln for reversing gases flowing out through the ash exit end of the kiln, and a burner in the chamber, the burner being directed into the kiln. However, owing to the comparatively large amount of heat developed, it is convenient to provide means for preventing over-heating of the ash exit end of the kiln. To this end we therefore, in accordance with a further preferred feature of the invention, provide a housing surrounding the ash exit end of the kiln and defining an annular space between it and the ash exit end, and means for spraying water into this space, the water passing into the pan. This constitutes a particularly simple construction for using the same water for cooling the ash exit end of the kiln and for quenching and extinguishing the ash.

A refuse burning installation embodying the invention will now be described with reference to the attached drawings.

FIG. 1 is a general side view of the installation.

Figure 2:
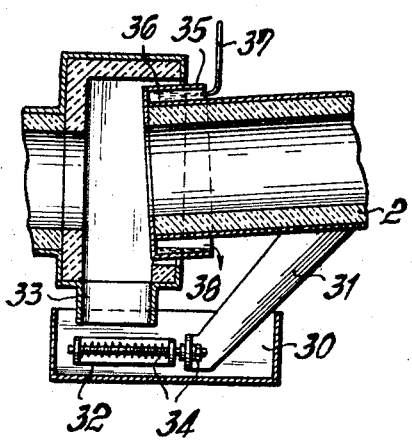
FIG. 2 is a section, on a larger scale, of the ash exit end of the rotary kiln forming part of the installation.

As shown in FIG. 1 the installation for burning refuse is mounted on railway rails 1, preferably of standard gage, serving as a foundation or placement. The main parts of the installation are constituted by a rotary kiln 2, a refuse charging device 3, burners 4 and 5 for operating the inclined rotary kiln 2, a flue 6 serving for the removal of flue gases and for preheating air needed for combustion. The air for combustion passes through an annular gap between the flue 6 and a surrounding sleeve 7 and is then forced by a blower 8 into the rotary kiln 2. The installation further comprises a device for removing dust from the flue gases by means of a cyclone 9 which is connected by a falling pipe 10 and a blower 11 with a stack 12.

Figure 3:
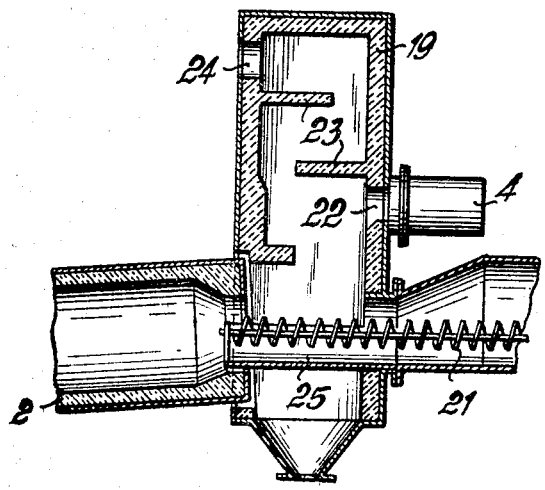
FIG. 3 is a section, also on a larger scale, of the refuse entry end of the kiln, showing the combustion chamber.

The individual parts of the installation are mounted on rail vehicles. Thus, starting from the left, vehicle 13 carries the stack 12 and the pipe 10, while the cyclone 9 together with its flue 6 is carried on an adjacent vehicle 14. The burner (not specially designated by a reference numeral) arranged at the ash exit end of the kiln, i.e. the lower left hand end of the kiln, is carried by a vehicle 15. A vehicle 16 carries a further part of the installation which will be described presently, while the vehicle 17 carries the rotary kiln 2. The combustion chamber 19, together with the blower 8 carried by it, to be described with reference to FIG. 3, is carried by vehicle 18, while vehicle 20 carries the refuse charging device 3. The connecting sleeve 7 may be separated from the flue 6 and the combustion chamber 19 when the installation is disconnected for transport or other purpose.

The various parts of the installation are carried on their separate vehicles, which are provided with disconnectable connections, not separately illustrated, so as to ensure that the parts can co-operate together as a whole.

One of the main purposes of arrangement on individual vehicles is to enable relative movement to take place between them to allow for thermal expansion. A further purpose is to enable the parts to be moved apart for inspection and servicing. Although it is a possibility not entirely to be ruled out, transport of the installation from one place to another on the vehicles shown is not specifically intended and instead it is preferred to use low-loaders for this purpose.

Refuse to be burned is deposited on a chain conveyor 40 which lifts the refuse and deposits it in funnel or hopper 39 of the charging device 3. At the bottom of the funnel, the refuse is engaged by a screw conveyor 21 passing into and through the combustion chamber 19 to the upper, intake end of kiln 2. The screw conveyor 21 loosens the refuse and the radiant burner 4, which has access to the chamber 19 through aperture 22, removes moisture from the refuse, the moisture escaping in the form of steam upwards past baffles 23. The burner 4 also serves to ignite the refuse on the screw conveyor 21. The refuse passes along the kiln to the left and gaseous products of combustion passing along the kiln in the opposite direction enter the combustion chamber 19, their flow being promoted by the action of the burner 4 which also ensures that no unburned gaseous materials leave the chamber 19 through the outlet 24. On leaving through the latter, the gaseous products of combustion, now to be considered as flue gases, pass along the flue 6 where they preheat combustion air as previously described.

As shown in FIG. 3, the combustion chamber 19 comprises an open chute 25 arranged at the end of the screw conveyor 21 and serving to guide refuse into the rotary kiln 2.

The ash removing device is mounted on the vehicle 16, and as shown in FIG. 2, comprises a water pan 30 at the bottom or ash exit end of the rotary kiln 2. While the water pan 30 is stationary, arms such as 31 are carried on the rotary kiln 2 to rotate with it. The ends of the arms remote from the kiln 2 carry ash removal shovels 32 for moving the ash out of the pan and preventing it forming a pile in the pan which would block the downward passage of further ash from the kiln end. In order to prevent the shovels jamming, they are journalled on pins fixed to the arms and can swing around these pins against the action of restoring springs 34.

At the left hand end of the rotary kiln 2 we provide a reversing chamber heated by a burner. Since the construction and function of such chambers, that is to say to cause gases flowing down the kiln to the left to be reversed, are well understood by those in the art, this part of the installation is not described in detail. The burner is directed into the kiln.

Owing to the arrangement of the burners, the lower end of the kiln is subjected to a substantial heating action. To counter this and prevent damage to the lower end of the kiln, we provide a housing 35 surrounding the latter end of the kiln so as to define an annular space 36 between it and the kiln. Water is sprayed by one or more nozzle pipes 37 into the space 36 to cool the kiln end and then passes downwards as indicated by arrow 38 into the pan 30, so as to replenish water lost in cooling the ash coming down through opening 33 from the kiln.

A notable advantage of the installation as just described with reference to drawings is its high rate of throughput despite the fact that it is transportable. This is in part due to the ability of the installation to work at comparatively high temperatures, which is a desirable feature from the point of view of municipal hygiene. The dust-removing means for cleaning the flue gases ensures that gases leaving the installation are unobjectionable.

A further substantial advantage is the fact that the parts can be separated on their vehicles for inspection, repair, or replacement.

The installation as described is suitable for both small and medium sized communities and also large cities.

Various modifications can be made in the installation shown. For instance, the parts can be mounted on various other types of vehicles instead of standard-gage railway vehicles.

While we have described one embodiment of the invention so that those skilled in the art may be able to take full advantage of the invention, it is to be understood that the scope of the invention is not to be limited to particular details shown in the drawings but is to be defined by the gist and spirit of the following claims.

We claim:

1. In an installation for burning refuse comprising a rotary kiln, means for charging refuse into one end of the kiln, ash removing means at the other end of the kiln, a burner for supplying heat to the kiln, flue means connected with the kiln, the flue means serving for preheating air needed for combustion of the refuse, and means for removing dust from flue gas from the kiln, the invention which consists in that the installation further comprises a vehicle for said rotary kiln, another vehicle for said refuse charging means, another vehicle for said burner, another vehicle for said ash removing means, and another vehicle for said dust removing means and preheating air flue, and separable connections between adjacent ones of said vehicles respectively.

2. The structure as set forth in claim 1 further comprising a screw conveyor forming part of the charging means, a combustion chamber serving for ensuring that products of combustion leaving the kiln are fully burnt, the charging means being arranged to pass refuse through the combustion chamber into the kiln, and a burned in the combustion chamber for promoting flow of products of combustion in a gaseous state in the kiln in a direction opposite to the direction of travel of the refuse in the kiln, the burner also serving for preheating air for combustion.

3. The structure according to claim 2 further comprising an open chute in the combustion chamber for supporting the refuse moved by the screw conveyor.

4. The structure according to claim 1 further comprising shovel means arranged to rotate with the kiln, and a water pan for quenching the ash, the shovel means being arranged to dip into the water pan.

5. The structure according to claim 4 further comprising arms on which the shovel means are carried resiliently, the arms being attached to the rotary kiln.

6. The structure according to claim 5 comprising a housing on the ash exit end of the kiln and defining an annular space between it and the ash exit end of the kiln, and means for spraying water into this space, the water passing into the pan.

7. The structure according to claim 1 further comprising a chamber at the ash exit end of the kiln for reversing gases flowing out through the ash exit end of the kiln, and a burner in the chamber, the burner being directed into the kiln.

References Cited
UNITED STATES PATENTS

| | | | |
|---|---|---|---|
| 1,583,436 | 5/1926 | Atkinson | 110—14 |
| 2,094,152 | 9/1937 | Granger | 110—14 |
| 2,127,328 | 8/1938 | Egan | 110—14 |
| 3,042,389 | 7/1962 | Gieskieng | 110—14 X |

JAMES W. WESTHAVER, *Primary Examiner.*